United States Patent Office
2,937,928
Patented May 24, 1960

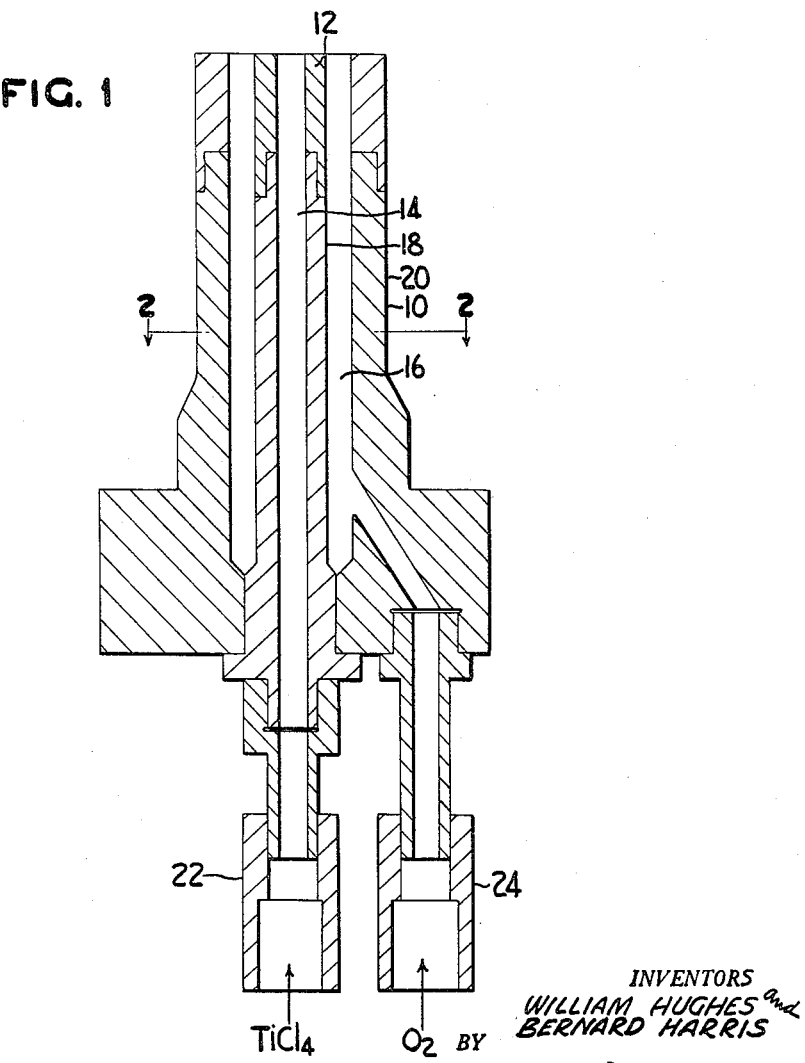

2,937,928

PREPARATION OF TITANIUM DIOXIDE

William Hughes, Fairfield, Stockton-on-Tees, and Bernard Harris, Acklam, Middlesbrough, England, assignors to British Titan Products Company Limited, Billingham, England, a British company Filed Apr. 20, 1956, Ser. No. 579,435

Claims priority, application Great Britain Apr. 10, 1956

8 Claims. (Cl. 23—202)

This invention relates to a method of making titanium dioxide pigment substantially in the rutile form by vapour phase reaction of titanium tetrachloride with oxygen.

Several methods have been described for the production of titanium dioxide (mainly for pigment purposes) by the vapour phase reaction of titanium tetrachloride and oxygen-containing gases. A greater part of the prior art, however, relates to the production of titanium dioxide substantially in the anatase form. In cases where the prior art relates to the production of the rutile pigment many difficulties have been experienced and it has been necessary to employ various expedients such as the introduction of extraneous reagents with the object of accelerating the production of the rutile modification. Most of the devices which have, so far, been suggested have been unsatisfactory for various reasons, amongst which are the inability to effect a high degree of rutilisation of the titanium oxide without some deterioration in regard to particle size which is an essential feature in the production of high grade pigments. They have also been unsatisfactory in that impurities, of necessity, had to be introduced, which impurities are difficult to introduce regularly and efficiently and lead to lack of uniformity of the resultant pigment, to adulteration of the final product, or to the presence of impurities in the resultant gases causing difficulty in subsequent chlorine recovery. Furthermore in most prior art processes the resultant gases have been low in chlorine content and have required extensive plant for chlorine recovery and the removal of other obnoxious gases.

It is an object of the present invention to produce a titanium dioxide pigment consisting substantially of the rutile modification and in such a high degree of purity and uniformity as to produce, under the optimum conditions a colour and tinting strength of outstanding merit. Furthermore, a pigment is produced suspended in gases which are exceptionally rich in chlorine so that on separation of the pigment from the gases the chlorine recovery is exceptionally efficient and economic.

According to the present invention, there is provided a process for the preparation of titanium dioxide pigment substantially in rutile form by reaction of titanium tetrachloride vapour and oxygen or oxygen-containing gases which process comprises the separate admission to a reaction chamber in the molar proportion of 1:1 to 1:6 of the titanium tetrachloride and oxygen, one or both of which are pre-heated in order to produce when mixed and irrespective of the heat of reaction, a temperature not below 300° C. and passing the two separate streams in the same direction in the reaction chamber in such a way that the titanium tetrachloride stream is admitted within the oxygen stream, through one or more ports whose perimeter per unit cross-sectional area is greater than 26 cm.$^{-1}$, the velocity ratio of the oxygen to the titanium tetrachloride being less than unity, the velocity of each gas being maintained so that the Reynold's flow number does not exceed 1800 and 500 respectively for the titanium tetrachloride and oxygen in the feed ports immediately prior to admission to the reaction chamber.

The whole reaction takes place in vapour phase and out of contact with solid surfaces.

With respect to the titanium tetrachloride feedport or feed ports to the reaction chamber, the relation of the perimeter to the cross-sectional area is preferably within 30 to 40 cm.$^{-1}$.

Water vapour may be present in the oxygen or oxygen-containing gases to the extent of 0 to 5%.

The titanium tetrachloride may contain 0 to 0.25% of silicon tetrachloride.

The termination of the titanium tetrachloride feed ports may be retracted relative to the termination of the oxygen feed ports.

The titanium tetrachloride is preferably admitted into the oxygen stream, both streams moving within the reaction chamber in the same direction, in such a way as to produce a minimum of turbulence in the respective streams. The ratio of the velocity of the oxygen to the titanium tetrachloride is preferably 0.1 to 0.2:1.

The reaction of titanium tetrachloride with oxygen or oxygen-containing gases, such as air at elevated temperatures is substantially stoichiometric according to the following equation:

$$TiCl_4 + O_2 \rightarrow TiO_2 + 2Cl_2$$

and whilst, in practice, the admission of these gases in the above proportion will give this result, the reaction will proceed in a satisfactory manner where the proportions of oxygen are much higher, that is the reaction will proceed satisfactorily up to a proportion of $TiCl_4:O_2$ of 1:6. Beyond this, however, whilst the reaction will still take place, the resultant gases become too dilute. Alternatively below the proportion of 1:1 there arises the problem of $TiCl_4$ recovery.

In the practical conduct of the invention it is essential that the gases should be fed to the reaction chamber in such a way that the reaction will take place essentially out of contact with the hot surfaces including the surrounding walls of the reaction chamber and the jets or tips of the particular conduits through which they are admitted. It will be obvious therefore that the gases should react within a limited reaction zone so that the reaction is complete before either contacting the walls of the reaction chamber or entering the ducting leading therefrom. It is also essential to the invention that the temperature of the gases within the reaction zone should be such that the above conditions may be accomplished. Whilst the reaction of titanium tetrachloride and oxygen is strongly exothermic, it is not possible using feed ports as described in prior art or in the present invention to conduct the reaction within a limited zone fully utilising directly the heat so generated and thus it is essential to this invention that one or both of the gases and preferably both of them should be adequately preheated in order to produce a gas mixture irrespective of the heat of reaction which would have a temperature of at least 300° C. Some difficulty exists in the measurement of such a temperature not only because the gases on admixture will immediately react or because the gases being admitted in separate streams admixture takes place over a period of time during which the reaction is partially initiated but also because the actual determination of temperature at the point of ejection of the gases is in practice difficult as is generally well recognized. Apart, altogether, from the more general difficulty of measuring the temperature of gases in this temperature range there are problems due to the size of the jet and due to turbulence, corrosion, and other difficulties, which are of major importance in constructing apparatus for this purpose. In consequence of these difficulties temperatures as defined herein have been measured in the gas stream at points which are remote from the point of ejection, the temperature of the gases admitted to the furnace being measured by thermocouple external but adjacent to a part of the ducting.

It is found that the temperature which the gases would attain on admixture and irrespective of the heat of reaction most suitable for the attainment of this reaction ranges from 300 to 950° C. (preferably from 400 to 925° C.).

In cases where the gases are admitted at low temperatures within the above range it is often desirable to augment the heating within the chamber. This may be effected by external heating such as electrical, gas or other well known means. In these cases temperature control is effected by means of a pyrometer located adjacent to the reaction chamber at a point corresponding in its length with the position of the titanium tetrachloride stream at its point of emergence in such a way that the temperature shown by this pyrometer is maintained constant and within a range of 1200° C. to 700° C. preferably 1150° C. to 825° C.

In the operation of this invention the gases may be admitted separately to the reaction chamber through separate ductings which tend to yield a parallel flow as, for instance, through a concentric ducting. In this latter case the titanium tetrachloride is fed through the central orifice with the oxygen or oxygen-containing gases fed through the surrounding annulus. The method of admission of the gases through such ducting, however, is important, the inner titanium tetrachloride stream being fed in a viscous non-turbulent flow with the outer stream, e.g. the oxygen gas fed in a slowly moving stream in the same direction.

In order to obtain laminar and non-turbulent flow of the gases it is necessary to control the gas velocities according to the ducting employed. Irrespective of the shape of the cross section of the ducting at the point of emergence, the walls of such ducting should be straight sided and parallel for a length of at least 20 times the hydraulic radius especially when the gas velocities are of an order associated with a Reynold's flow number of 1800. Shorter lengths of straight sided and parallel ducting at the point of emergence may be tolerated for lower gas velocities and, for instance, may be not less than eight times the hydraulic radius when the gas velocities are of the order associated with a Reynold's flow number of not more than 600. By hydraulic radius is to be understood the cross sectional area of the ducting divided by the enclosing perimeter.

The titanium tetrachloride is admitted through a ducting under the conditions of streamline flow, that is to say with a Reynold's flow number preferably not exceeding 1,800 into an oxygen atmosphere slowing moving in the same direction, the condition of streamline flow of both gases being afforded by conduits, the containing walls of which are parallel to the direction of flow for a length which is substantially greater than the minimum width of the ducting as described above, the absolute velocity of the gases varying from 0.5 to 10 metres/second, the comparative velocity of the titanium tetrachloride to the oxygen varying from 1:1 to 10:1. In order to obtain optimum results it is necessary also to operate with titanium tetrachloride orifices of limited dimension and, since the actual shape of the orifice is relatively unimportant, that is to say it may be rectangular (e.g. square), circular, annular or oval or of a comparatively irregular shape, the main condition to be observed is the relationship between the periphery and the cross-sectional area. It is convenient to define the limiting size in terms of periphery and under these conditions the limiting dimensions area are greater than 26 cm.$^{-1}$ and preferably within 30 to 40 cm.$^{-1}$.

Whilst the reaction may be conducted as described above, using substantially anhydrous gases, it has been found that advantageous results may be obtained where the oxygen containing gases have a moisture content which may vary from 0 to 5% by weight. This may be controlled by passing the oxygen gases through a tower irrigated by water maintained at a temperature of 35° C. or at correspondingly higher or lower temperature according to the proportion of moisture found desirable. A further advantageous result may be obtained by the addition of up to 0.25% silicon tetrachloride added to the titanium tetrachloride either prior to or after vaporisation of the latter. Where admixed prior to vaporisation steps must be taken to assure that preferential distillation cannot take place which would otherwise detract from the operation of the invention.

The invention as so far described relates to the feeding of gases through a concentric type burner. Various alternative devices for feeding the gases into the reaction chamber whereby the titanium tetrachloride is injected into an oxygen gas atmosphere moving in the same direction will however produce a similar result. Thus, it is possible to feed the gases through separate jets where the gases are directed in the furnace in a substantially parallel direction, the reaction chamber being of adequate size so that the reaction is complete and out of contact with the walls thereof. However, the more convenient method of feeding the gases is by means of a concentric burner but this may take various forms. Thus, the titanium tetrachloride may be conveyed from a chamber or ducting through a plurality of orifices, the main ducting, in turn, being surrounded by an annular ducting through which the oxygen is supplied to provide the essential envelope. The conditions pertaining to the orifices and to the outer annulus being such that the Reynold's flow numbers as outlined above are not exceeded. A further improvement is also to be obtained in which the central ducting (whether providing a single plain jet or whether consisting of a ducting terminated by a plate containing a plurality of substantially parallel jets or a nest of tubes affording a plurality of separate streams) may be retracted with respect to the outer annular ducting supplying the oxygen gas atmosphere. This retraction of the inner titanium tetrachloride jet or ducting terminated by a plurality of jets, has the effect of controlling the particle size of the ultimate product. The amount of retraction may be of the order of 1 to 10 mm. although retraction of the order of 3 to 8 mm. is preferred.

The reaction vessel as well as the conduits leading thereto and therefrom may be constructed from a variety of materials which are refractory and especially resistant to hot titanium tetrachloride and chloride vapours at the temperatures employed, such as silica, alumina, refractory concrete and fired steatite. The latter is very suitable for the construction of the ports of entry sometimes referred to as the burner, since it may, in its raw mineral state, be mechanically shaped, e.g. turned, drilled and threaded, prior to firing and, during firing, it will substantially retain the shape or form so machined.

The size of the reaction chamber is relatively unimportant provided, as mentioned above, the reaction can be substantially completed within the chamber, out of contact with the walls thereof. It is convenient to maintain a relatively large ratio of at least 10:1 between the diameter of the reaction chamber and the external diameter of the feed ports (i.e. of the outer annulus in the case of a concentric burner of the feed port assembly. The length of the chamber depends largely on the distance travelled by the titanium tetrachloride stream before it disperses into a substantially uniform mixture and the chamber may be constructed to have a length at least twice this distance. Whilst the chamber is normally regarded as cylindrical, this is again unimportant and plant with other cross sections may be employed but it is desirable to inject the reactant gases from one end and preferably on or near the estimated central axis of the cylinder so that the gas streams move in the same direction and with a minimum risk of contact with the walls or turbulence caused by such contact over the distance required for reaction to take place, i.e. the minimum length of the furnace as defined above.

In order to avoid reaction at or near the jets or points of admission of the reaction gases, it is desirable that the tips are maintained in a relatively cool condition. Where this is not possible by loss of heat to the surroundings, it may be desirable to introduce cooling devices such as liquid circulation through conduits within or surrounding a thermally conductive jet tip. By this means, even though the temperature of the gases admitted may be of the order of 900° C., the actual surface at the point of injection, where growth of reactant material may take place, is maintained at a temperature below that at which the reaction can quickly be effected. The reaction may be conducted at sub-atmospheric and super-atmospheric pressures.

The hot mixture discharged from the reaction furnace consists of titanium oxide in very fine suspension in gases consisting of chlorine, hydrochloric acid, unreacted components and other inert gases which may have been introduced with the feed. The suspension, which behaves in similar manner to an aerosol, may be cooled by well known means, e.g. by indirect cooling in the conduits through which it passes or by recirculation of cool gases from later stages in the process, by passage through an indirectly cooled fluidised bed of inert solids or by chilling with inert liquids such as titanium tetrachloride or liquid chlorine. This initial cooling enables subsequent handling in vessels which would otherwise be attacked by the hot gases. The product may subsequently be separated from the cool or partially cooled gases in cyclones, electrostatic precipitators or ceramic or bag filters.

In the operation of the invention as described above, products which are substantially titanium oxide in rutile form, that is containing at least 90% of rutile, are produced with a mean particle size of the order of 0.1 to 0.35μ. The products have an exceptionally white colour and are of a general pigmentary quality hitherto unattainable.

Following is a description by way of example of methods of carrying the invention into effect.

A cylindrical silica reaction chamber eight inches in diameter and 36 inches in length is mounted vertically within an insulated electrically heated furnace.

Liquid titanium tetrachloride is fed through a tube of ⅜ inch bore to an expansion tube of ¾ inch bore within the furnace where it is vapourised and preheated and thence fed through further ducting of ⅜ inch bore to the reaction chamber via a burner. Oxygen is fed to the burner and reaction chamber through a tube of ¼ inch bore containing a preheating coil.

The lower part of the combustion chamber is connected by a reduction piece to a forty litres collecting vessel. The gaseous products of reaction are separated from the pigment produced and removed from the collecting vessel through a Terylene covered wooden filter tube by an extractor fan connected to ducting. The pigment settles in the bottom of the collecting vessel which can be emptied by removal of a plug at the foot.

A typical burner which has been used is illustrated in the accompanying drawing, in which Figure 1 is a vertical cross-sectional view, and Figure 2 is a horizontal cross-sectional view. This burner has a cylindrical central jet 12 for admitting titanium tetrachloride 6 mm. in diameter and a straight length section 14 prior to discharge of 17 cm., and external to it an annulus 16 contained within cylinders (20 and 18, respectively), 2.5 cm. and 1.5 cm. diameter respectively with a length of straight ducting prior to a discharge into the reaction chamber of 8 cm. Titanium tetrachloride was supplied to the jet 12 through conduit 22 and oxygen was supplied to the annulus through conduit 24. The furnace in which the apparatus was contained was maintained at a temperature of between 850° C. and 950° C. The molar ratio of oxygen to titanium tetrachloride was 4:1. Operating in this way, the following results are obtained.

TABLE I

| Rate of Feed, cc. Liquid TiCl₄/min. | Estimated Temp. of TiCl₄ at burner, ° C. | Estimated Temp. of O₂ at burner, ° C. | Estimated Velocity of TiCl₄ vapour emerging from burner, m./sec. | Estimated Reynold's Flow Number of TiCl₄ vapour immediately prior to injection | Estimated Reynold's Flow Number of O₂ vapour immediately prior to injection | Rutile, Percent | Tinting Strength, Reynold's |
|---|---|---|---|---|---|---|---|
| 7.5 | 780 | 775 | 3.5 | 1,580 | 99 | 42.0 | 1,450 |
| 9.0 | 740 | 730 | 4.1 | 1,980 | 131 | 70.0 | 1,370 |
| 12.5 | 690 | 670 | 5.3 | 2,770 | 180 | 91.6 | 1,080 |
| 20.0 | 680 | 630 | 8.4 | 4,480 | 304 | 96.5 | 760 |

In this table it will be noted that only at high flow numbers for the titanium tetrachloride of 2,500 and above was a rutile content of over 90% obtained: on the other hand only with a low flow number for the titanium tetrachloride was the tinting strength sufficiently enhanced. This table is used to demonstrate that the lower the flow number for the titanium tetrachloride the finer the product and the higher the flow number for the titanium tetrachloride, the greater the tendency for the product to rutilise.

This work was continued using finer orifices but in view of the lower output obtained thereby the device having a plurality of orifices was resorted to. The burner therefore consisted of a central duct terminated by a plate 7 mm. thick having perforations of the size indicated below arranged in a circular pattern on the plate. External to the central conduit for feeding the oxygen gases was an annular ducting limited by parallel cylindrical walls 25 mm. and 15 mm. diameter respectively, the length of the straight ducting prior to discharge into the reaction chamber being 8 cm. Operating under conditions otherwise as described above the results illustrated in Table II were obtained.

TABLE II

| | | | | | | | |
|---|---|---|---|---|---|---|---|
| Cc. Liquid $TiCl_4$/min | 3.0 | 5.0 | 7.5 | 10.0 | 12.5 | 15.0 | 20.0 |
| $TiCl_4$ vapour temp., °C | 885 | 840 | 780 | 730 | 690 | 680 | 680 |
| $O_2$ temp., °C | 895 | 840 | 775 | 715 | 670 | 630 | 630 |
| $O_2$ velocity, m./sec | 0.60 | 0.92 | 1.27 | 1.60 | 1.92 | 2.24 | 2.98 |
| $O_2$ Reynolds Number | 39 | 64 | 99 | 139 | 180 | 228 | 304 |
| Jet Diam. 0.6 cm.: | | | | | | | |
| $TiCl_4$ Reynolds flow number | | | 1,580 | 2,200 | 2,770 | 3,300 | 4,480 |
| Percent Rutile in product | | | 42.0 | 80.0 | 91.6 | 95.0 | 96.5 |
| Tinting strength of product | | | 1,450 | 1,270 | 1,080 | 930 | 760 |
| Jet Diam. 0.16 cm. (×5): | | | | | | | |
| $TiCl_4$ Reynolds flow number | | 710 | 1,190 | 1,610 | | | |
| Percent Rutile in product | | 71.0 | 83.0 | 93.0 | | | |
| Tinting strength of product | | 1,550 | 1,270 | 1,120 | | | |
| Jet Diam. 0.11 cm. (×8): | | | | | | | |
| $TiCl_4$ Reynolds flow number | | 620 | 930 | | | | |
| Percent Rutile in product | | 91.0 | 97.0 | | | | |
| Tinting strength of product | | 1,430 | 1,300 | | | | |
| Jet Diam. 0.06 cm. (×16): | | | | | | | |
| $TiCl_4$ Reynolds flow number | 630 | 1,050 | 1,580 | | | | |
| Percent Rutile in product | 94.1 | 96.0 | 98.2 | | | | |
| Tinting strength of product | 1,320 | 1,120 | 1,030 | | | | |

In this table it will be seen that the tendency of high flow numbers to produce a high rutile content and low flow numbers to promote a finer particle size, and hence higher tinting strength values are maintained. The table further discloses, however, that where the jet diameters are decreased an optimum condition is attained whereby the high strength is maintained with a very much enhanced degree of rutilisation.

Example 1

The following experiment is selected from Table II for which the apparatus has already been described with the exception that the perforations in the plate covering the central duct of the burner consisted of 8 holes 1.1 mm. in diameter and 10 mm. deep, arranged on a circle 11 mm. in diameter.

The reaction chamber was maintained at a temperature of 950° C. The oxygen and titanium tetrachloride were fed in the molar ratio of 4:1 and the titanium tetrachloride jet employed had a perimeter:area of 36.4 cm.$^{-1}$. The titanium tetrachloride fed to the apparatus metered in liquid form at the rate of 5 mls./min. was vaporised through a preheater maintained at a wall temperature of 850° C. in order to be admitted through the central conduit of the burner. The oxygen was metered and passed through a preheater maintained at a temperature of 850° C. The temperature which the gases would attain on mixing irrespective of the heat of reaction was 840° C. Operating in this way it is calculated that at the point of injection the flow number for the titanium tetrachloride was 620 and the flow number for the oxygen was 64. The experiment was conducted for a period of half an hour. At this stage the product which had collected in the receiver was removed and on examination found to have a tinting strength of 1430 and a rutile content of 91%.

Example 2

The apparatus and the burner employed in this experiment were as described in Example 1. The oxygen to titanium tetrachloride molar ratio was 6:1 and the rate of feed of the titanium tetrachloride 5 mls./min. The temperature of the reaction furnace was 925° C. The titanium tetrachloride was vaporised and preheated to a wall temperature of 830° C. in order to be admitted through the central ducting of the burner. The oxygen was preheated to a wall temperature of 850° C. The temperature that the gases would attain on mixing irrespective of the heat of reaction was 820° C. The flow number for the titanium tetrachloride admitted was 620 and the flow number for the oxygen was 60. Operating in this way for half an hour a titanium dioxide pigment was collected and on examination was found to have a tinting strength of 1380 and a rutile content of 91%.

Example 3

This experiment was operated in the manner described in Example 2 except that the burner was constructed with a titanium tetrachloride inlet retracted with respect to the oxygen inlet by a distance of 7 mm. Operating in this way the product had a tinting strength of 1580 and a rutile content of 92%. This product had a very fine size and a neutral tone.

Example 4

This was conducted as in Example 3 with the exception that the oxygen was admitted with a moisture content of 2.3% $H_2O$. This was obtained by bubbling the oxygen through a wash bottle containing water maintained at 35° C. prior to entering the preheater. The product obtained had a tinting strength of 1580 and a rutile content of 96%. This product again had a very fine size and a neutral tone.

Example 5

Operating as in Example 4 but with the addition of 0.07% silicon tetrachloride to the titanium tetrachloride a product was obtained having a tinting strength of 1800 and a rutile content of 91.5%.

Example 6

This was operated in the manner described in Example 5 but with a slightly increased throughput of 6.0 ccs. per minute of titanium tetrachloride, thus giving a flow number at the point of entry into the reaction chamber of 740 and the flow number of the oxygen was 70. Operating in this way a tinting strength of 1360 and a rutile content of of 97.6% was obtained.

Example 7

The apparatus and burner employed in this experiment are similar in design to that described in Example 1 except that the oxygen annulus was contained by parallel cylindrical walls 17.3 and 15 mm. diameter. The liquid titanium tetrachloride was fed at the rate of 5 ccs. per minute and emerged at the burner tip at a temperature estimated as 840° C. and with a flow number of 620.

The oxygen was fed at a rate corresponding to the molar ratio $O_2:TiCl_4::1.2:1$ emerging from the annular jet into the reaction chamber at an estimated temperature of 910° C. and a flow number of 20.

The product so obtained had a rutile content of 94% and a tinting strength of 1170. The resultant gas contained 91% chlorine.

Example 8

The apparatus was as described in Example 7.

The liquid titanium tetrachloride was fed at the rate of 5 ccs. per minute and emerged at the burner tip at a temperature estimated as 840° C. and had a flow number of 620.

The oxygen was fed at a rate corresponding to a molar ratio $O_2:TiCl_4::2.4:1$ and emerged from the annular ducting at an estimated temperature of 880° C. and a flow number of 40.

The titanium oxide produced had a rutile content of 90% and a tinting strength of 1380. The resultant gas contained 59% chlorine.

Throughout this specification wherever tinting strength values are given they have been determined according to the "Reynold's method" which is described on pages 92 to 93 of "Physical and Chemical Examination of Paints, Varnishes, Lacquers and Colours," by H. A. Gardner, 8th edition, published by the Institute of Paint and Varnish Research.

It will be generally understood that commercial rutile pigments have a yellow tone as compared with pigments of the anatase variety. In the above experiments it will be noted that some of the pigments had a neutral tone. This indicates that the familiar yellow tone normally associated with rutile pigments is not obtained, that is to say that the product is so fine that it has developed a much favoured and preferred neutral white tone.

We claim:

1. A process for the preparation of titanium dioxide pigment substantially in rutile form by reaction of titanium tetrachloride in vapor state and oxygen which process comprises the separate admission to a reaction chamber in the molar proportion of 1:1 to 1:6 of the titanium tetrachloride and oxygen, at least one of which is at a temperature high enough to produce when mixed and irrespective of the heat of reaction, a mixture having a temperature not below 300° C., and passing the two separate streams through separate feed parts and in the same direction in the reaction chamber in such a way that the titanium tetrachloride stream flows within the oxygen stream, and through a port whose perimeter per unit cross-sectional area is greater than 26 cm.$^{-1}$, the velocity ratio of the oxygen to the titanium tetrachloride being less than unity, the velocity of each gas being maintained so that the Reynold's flow number does not exceed 1800 and 500 respectively for the titanium tetrachloride and oxygen in the feed ports immediately prior to admission to the reaction chamber.

2. A process as claimed in claim 1 wherein with respect to the titanium tetrachloride feed port to the reaction chamber the relation of the perimeter to the cross-secional area is within 30 to 40 cm.$^{-1}$.

3. A process as claimed in claim 1 wherein the termination of the titanium tetrachloride feed ports are retracted relative to the termination of the oxygen feed ports.

4. A process as claimed in claim 3 wherein the retraction is from 1 to 10 mm.

5. In a process of preparing titanium dioxide pigment by reaction of oxygen and titanium tetrachloride in a reaction zone, the improvement which comprises separately introducing heated oxygen and titanium tetrachloride vapor into the reaction zone in the same direction through ports which are in close proximity to maintain the temperature of the reaction zone at the point of contact between the vapors sufficiently high to cause reaction therebetween, the velocity of the oxygen being maintained low enough so that the Reynold's flow number thereof in its port does not exceed 500 immediately prior to admission to the zone, the velocity of the titanium tetrachloride being held low enough so that the Reynold's flow number thereof in its port immediately prior to entry into the zone does not exceed 1800, and the ratio of the perimeter of said titanium tetrachloride port to its cross-sectional area being greater than 26 cm.$^{-1}$.

6. A process as claimed in claim 5 wherein the ratio of the perimeter of said titanium tetrachloride port to its cross-sectional area is in the range of from 30 to 40 cm.$^{-1}$.

7. In the method of preparing titanium dioxide by the reaction of titanium tetrachloride with oxygen in a reaction zone, the improvement which comprises establishing separate heated streams of oxygen and titanium tetrachloride flowing in the same direction and concurrently to each other, contacting the resulting flowing streams in the reaction zone while maintaining the Reynold's flow numbers of the oxygen and titanium tetrachloride streams at the point of contact thereof in the laminar flow area and not in excess of 500 and 1800 respectively, the temperature at the point of contact being sufficiently high to cause reaction between the streams to thereby produce titanium dioxide and chlorine.

8. The method of claim 7 wherein the linear velocity ratio of the oxygen stream to the titanium tetrachloride stream at the point of contact is less than unity.

References Cited in the file of this patent

UNITED STATES PATENTS

| | | |
|---|---|---|
| 2,240,343 | Muskat | Apr. 29, 1941 |
| 2,367,118 | Heinen | Jan. 9, 1945 |
| 2,394,633 | Pechukas et al. | Feb. 12, 1946 |
| 2,445,691 | Pechukas | July 20, 1948 |
| 2,488,440 | Schaumann | Nov. 15, 1949 |
| 2,779,662 | Frey | Jan. 29, 1957 |

FOREIGN PATENTS

| | | |
|---|---|---|
| 726,250 | Great Britain | Mar. 16, 1955 |